US008696839B2

(12) United States Patent
Gonzales et al.

(10) Patent No.: US 8,696,839 B2
(45) Date of Patent: Apr. 15, 2014

(54) HIGH SPEED DECORATING SYSTEM

(75) Inventors: James P. Gonzales, Lancaster, NY (US); David E. Zurawski, Clarence Center, NY (US); David B. Vaughn, North Tonawanda, NY (US)

(73) Assignee: Illinois Tool Works Inc., Glenview, IL (US)

( * ) Notice: Subject to any disclaimer, the term of this patent is extended or adjusted under 35 U.S.C. 154(b) by 29 days.

(21) Appl. No.: 13/005,792

(22) Filed: Jan. 13, 2011

(65) Prior Publication Data

US 2011/0108182 A1 May 12, 2011

Related U.S. Application Data

(62) Division of application No. 11/676,609, filed on Feb. 20, 2007, now Pat. No. 7,886,795.

(51) Int. Cl.
*B32B 41/00* (2006.01)

(52) U.S. Cl.
USPC .............. 156/64; 156/212; 156/215; 156/238

(58) Field of Classification Search
USPC ........... 156/64, 212, 215, 238, 360, 361, 362, 156/366, 367, 541, 542, DIG. 5, DIG. 9, 156/DIG. 33, DIG. 37, DIG. 45
See application file for complete search history.

(56) References Cited

U.S. PATENT DOCUMENTS

| | | | | |
|---|---|---|---|---|
| 5,188,696 | A | 2/1993 | Good | |
| 5,306,375 | A | 4/1994 | Leonard | |
| 5,565,055 | A | 10/1996 | Croci | |
| 5,660,676 | A * | 8/1997 | Brooks | 156/361 |
| 5,709,770 | A | 1/1998 | Asghar et al. | |
| 5,898,169 | A | 4/1999 | Nordbryhn | |
| 6,199,614 | B1 | 3/2001 | Snyder et al. | |
| 6,325,877 | B1 | 12/2001 | Murphy | |
| 2003/0034111 | A1 | 2/2003 | Oldenburg et al. | |
| 2006/0037706 | A1 | 2/2006 | Putzer | |
| 2006/0065371 | A1 | 3/2006 | Grabowski et al. | |

OTHER PUBLICATIONS

International Search Report and Written Opinion issued in connection with PCT/US20071004778 on Nov. 2, 2007.

* cited by examiner

*Primary Examiner* — George Koch
(74) *Attorney, Agent, or Firm* — Levenfeld Pearlstein, LLC

(57) ABSTRACT

A label applicator system provides for high speed, accurate label transfer from a web to items moving on an item transport along a path relative to the system. The items, such as bottles, have a contoured surface. The applicator includes a supply reel for supplying labels on a web and a take-up for taking up the web after transfer of the label. A drive roller moves the web through the applicator system. The system includes a web positioning assembly and a movable label applicator head. A contour sensor senses the bottle contour and develops a profile for the head to follow to apply the labels to the bottles. The supply, take-up and the drive are operably engaged with one another to maintain a relatively constant tension in the web. The web positioning assembly is configured to advance and retract the web to accommodate a pitch difference between the bottles in the bottle transport and the labels on the web and to accommodate movement of the decorating head toward and away from the bottles in the bottle transport.

6 Claims, 6 Drawing Sheets

HIGH SPEED DECORATING SYSTEM

This application is a division of U.S. patent Ser. No. 11/676,609, filed Feb. 20, 2007, now U.S. Pat. No. 7,886,795.

BACKGROUND OF THE INVENTION

The present invention relates to a decorating or graphic transfer system. More particularly, the present invention pertains to a high speed decorating system for label or graphic transfer that accommodates transfer to contoured surfaces and accommodates differences in pitch between the graphic and the receiving surface.

Containers, and particularly bottles, are often decorated with indicia, logos and the like, as well as information such as food stuffs ingredients and nutritional information. The decoration can be provided as a label that is, for example, glued or adhered to the bottle, or as printing applied directly to the bottle.

As to labeling the bottles, this can be done in a number of ways. For example, adhesives can be used to adhere the label (e.g., pressure sensitive labels) directly to the bottle, such as a film-like wrap around label commonly used on 2 liter soda-pop bottles. Other methods include adhering a full, sleeve-like label both to itself and to the bottle. Another method includes wax transfer labels, in which a label is transferred from a web having a wax release layer. The wax transfer labels provide the least degradation over time. In addition, unlike pressure sensitive labels, the wax transfer label does not have to be removed prior to recycling, which is a consideration that is of increasing importance.

Label applicator machines for transferring labels from the carrier web to the bottles have become complex. Due to the increasing demand on manufacturing efficiencies and the attendant costs, many such machines are designed to provide increased throughput with lower labor costs.

In addition, the complexity of bottle profiles has also placed a high demand on the operating equipment. In order to assure that the label properly transfers to the bottle, the bottle contour must be precisely known, and the indexing of the bottle vis-à-vis the label (e.g., an accommodation of the label and bottle pitches) must be made. These steps, however, are found to be difficult to carry out and time intensive.

Accordingly, there is a need for a high speed wax transfer decorating system that accurately maps the profile of a bottle and adjusts the label position and the label web speed to properly apply the label to the bottle. Desirably, such a system also accounts for the change in supply and take-up spool diameters to monitor the quantity of labels remaining on the web to provide indication that the label supply is running low.

BRIEF SUMMARY OF THE INVENTION

A label applicator system provides for high speed, accurate label transfer from a web to items moving on an item transport along a path relative to the system. The items, such as bottles, have a contoured surface.

The present system accurately maps the profile of the bottle and adjusts the label position as well as the label web speed to properly apply the label to the bottle. The system also accounts for the change in supply and take-up spool diameters as the label web moves through the applicator and the labels are transferred to the bottles (as the labels are used).

The applicator includes a supply, such as a reel for supplying the web (with the labels on the web) and a take-up for taking up the web after transfer of the label from the web to the bottle. A drive element such as a roller moves the web through the applicator system.

The application includes a web positioning assembly and a movable label applicator head. A contour sensor senses the bottle contour and develops a profile for the head to follow to apply the labels to the bottles. The overall system is controlled by a control system.

The supply, the take-up and the drive element are operably engaged with one another to maintain a relatively constant tension in the web. The web positioning assembly is configured to advance and retract the web to accommodate a pitch difference between the bottles in the bottle transport and the labels on the web. The web positioned assembly also advances and retracts to accommodate movement of the decorating head toward and away from the bottles in the bottle transport.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
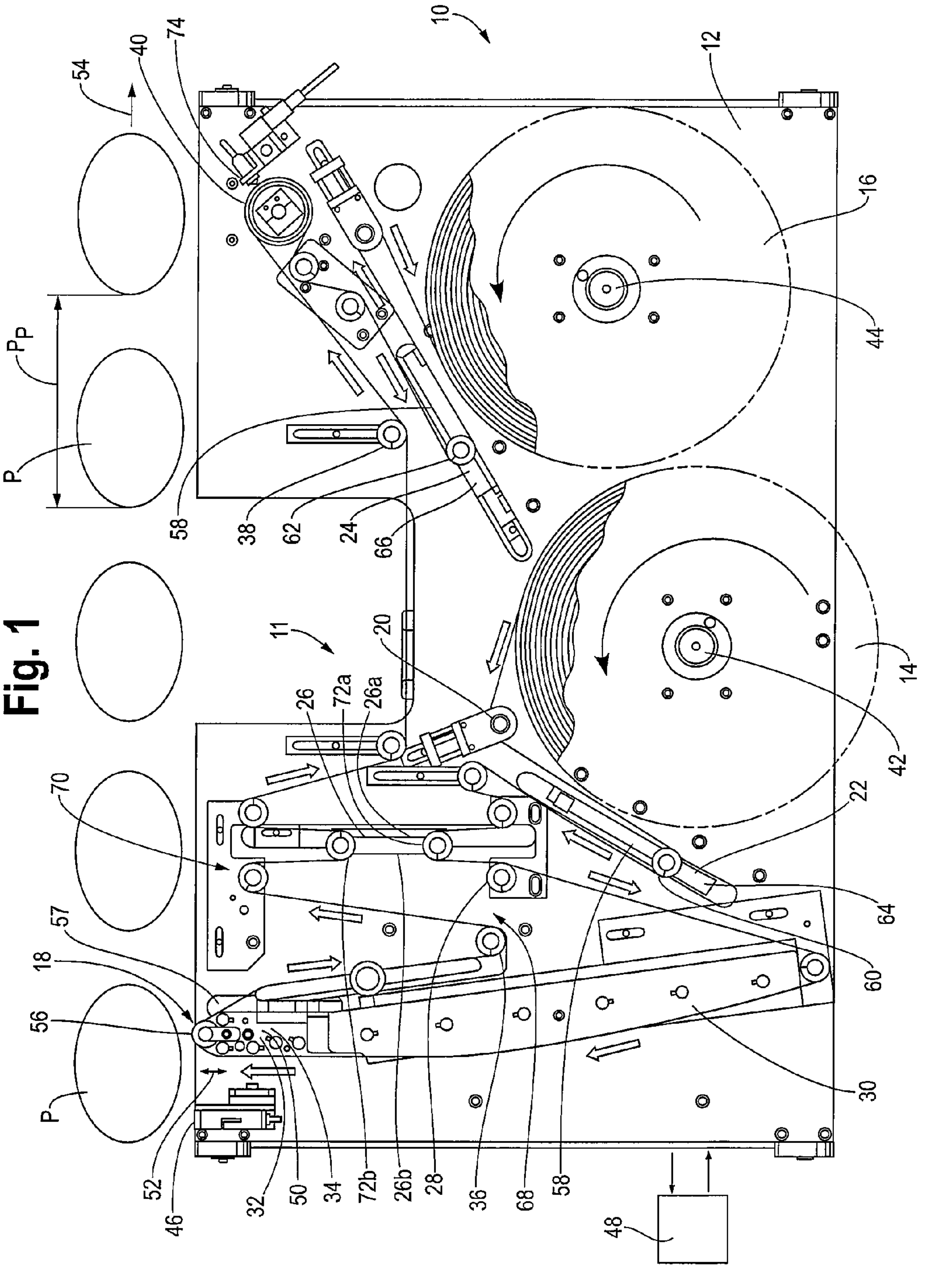
FIG. 1 is an illustration of a high speed decorating system embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures and in particular, to FIG. 1 there is shown an illustration of a high speed wax transfer system 10 embodying the principles of the present invention. The transfer system 10 includes a web transport system illustrated generally at 11, mounted to a frame 12 having a payout reel 14, from which a web W having labels L thereon are fed and a take-up reel 16 that takes up the web W after transfer of the labels L. As will be appreciated by those skilled in the art, generally, labels L are presented on a waxed web W that is wound around the payout reel 14, introduced to a decorating or applicator head 18 at which the labels L are separated from the web W and transferred to a product P such as a bottle, and the label-less web W is then rewound onto the take-up reel 16 for later processing.

The web W is fed from the payout reel 14 over a first roller 20 and is redirected to a payout analog dancer arm 22, over which the web W is again redirected. As will be discussed in detail below, the payout dancer arm 22, along with a take-up analog dancer arm 24, and the payout and take-up reel 14, 16 movements serve to maintain a constant tension on the web W as it moves through the applicator system 10 to orderly and accurately position labels L for transfer to the products P.

Moving along the web W path, from the payout dancer arm 22, the web W passes over one side 26*a* of a reciprocating servo web positioner 26, around additional (idler) rollers 28 and on to a heating element 30. The back side of the web W is heated and passes over the reciprocating servo decorating head 18 at which the label L is transferred from the web W onto the product P. A heater block indicated generally at 32 at the decorating head 18 (in the support 34 for the head 18) further heats the web W just prior to label L transfer. The label-less web W passes over additional idler rollers 36 and onto an opposing end 26*b* of the web positioner 26.

Following the web positioner 26, the web W passes over additional idler rollers 38 and over a servo-driven web feed roller 40 after which the web W traverses over the take-up dancer arm 24 and onto the take-up reel 16. The servo-driven web feed roller 40 provides the drive to move the web W through the system 10, while the payout and take up reels 14, 16 are intended to supply and take up the web W and to provide a general or gross tension in the web W.

Both the payout and take-up reels 14, 16 are also servo driven, mounted to shafts 42, 44 for rotation. The payout and take-up dancer arms 22, 24 are analog (e.g., linear) movement elements that move along respective paths that are about tangential to their respective reels 14, 16. The dancer arms 22, 24 are both biased (sprung, as indicated at 58) to maintain tension on the web W as it is fed from the payout reel 14 and as it is wound onto the take-up reel 16.

Figure 2:
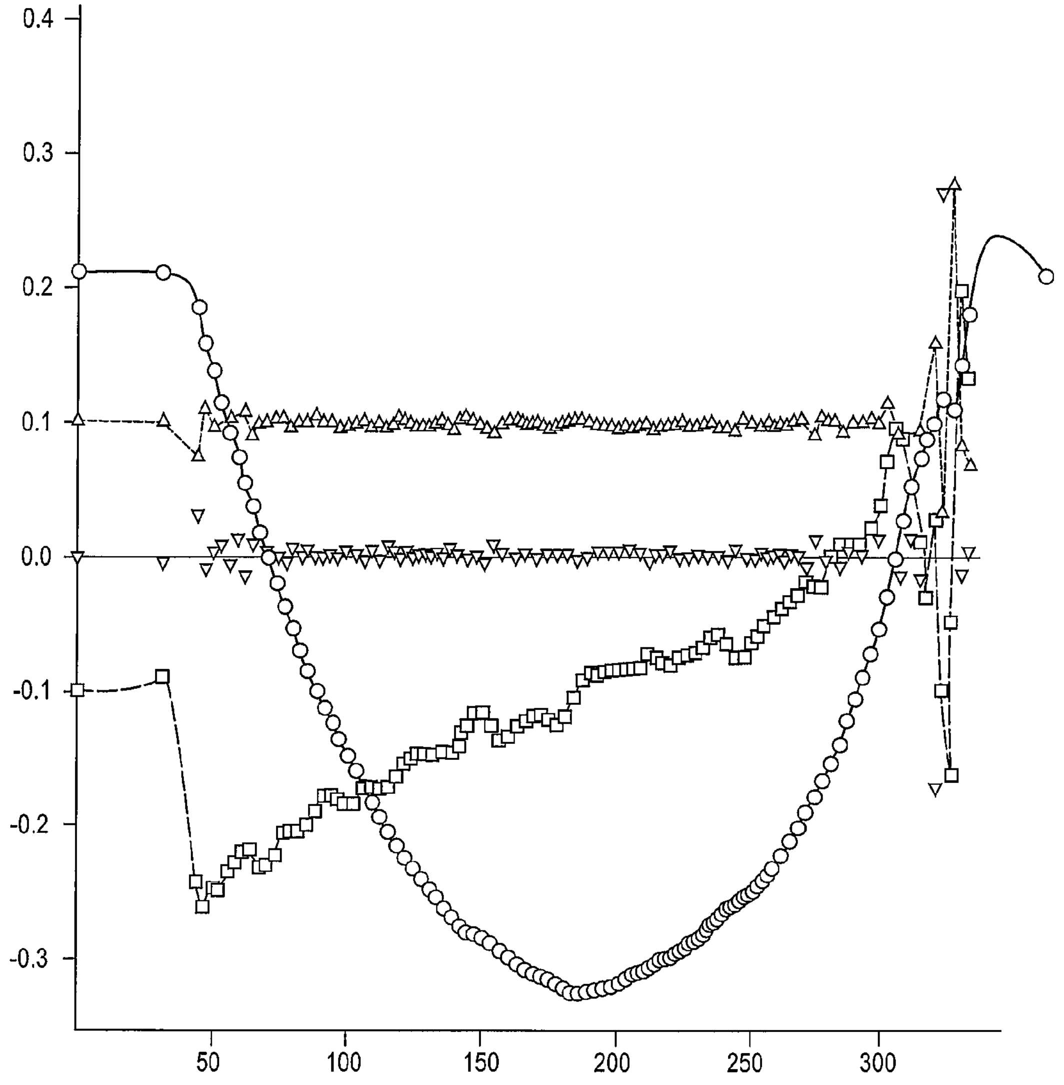
FIG. 2 is an exemplary bottle profile representing the surface contour of a typical bottle.
Figure 3:
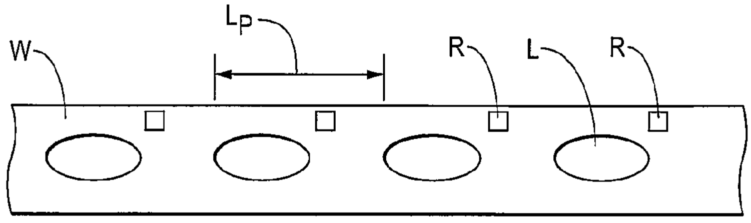
FIG. 3 is a plan view of a portion of an exemplary web with labels there showing the label pitch.
Figure 4:
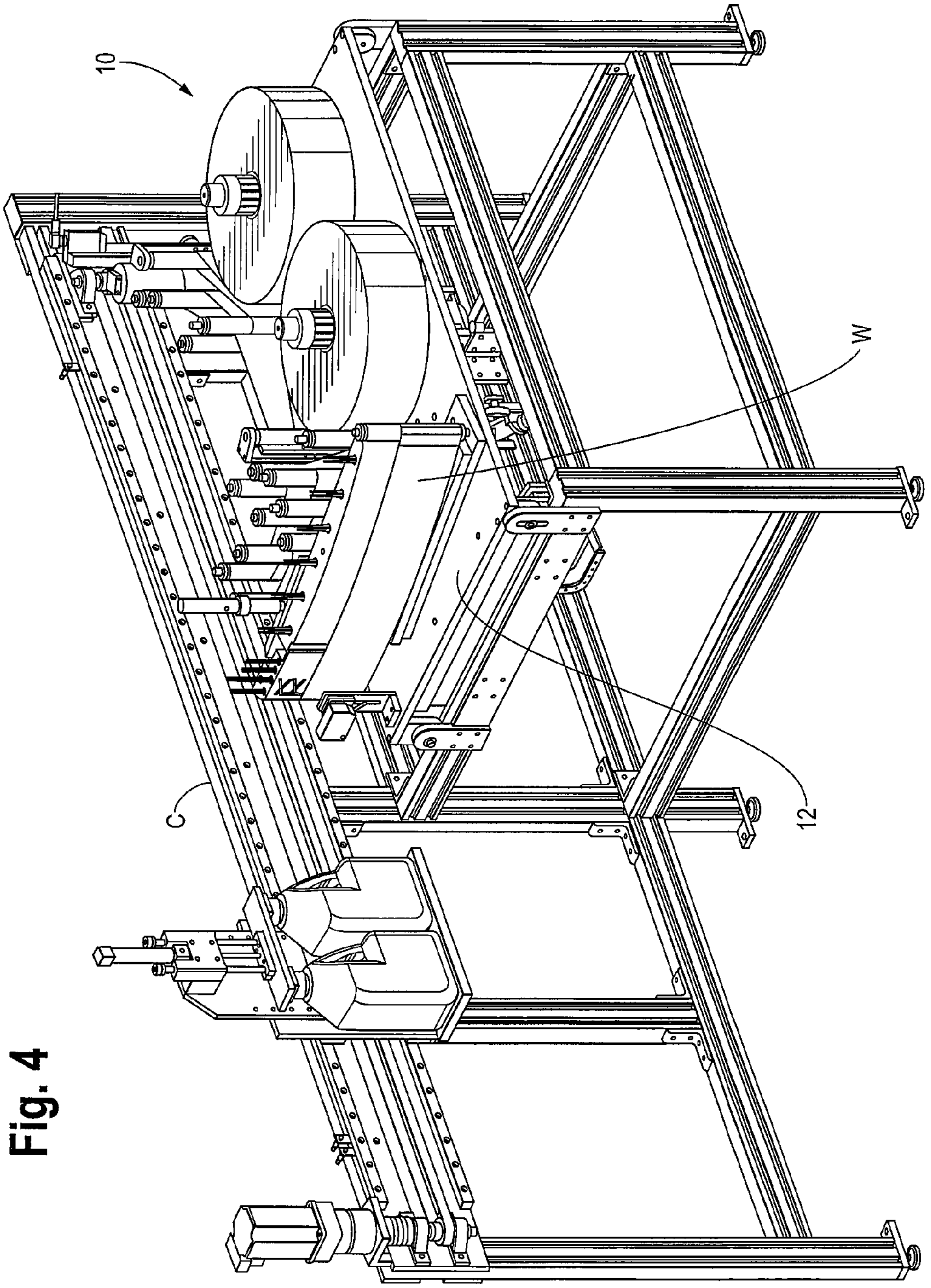
FIGS. 4 and 5 are perspective views of an embodiment of the high speed decorating system with two bottles mounted on a conveyor.
Figure 5:
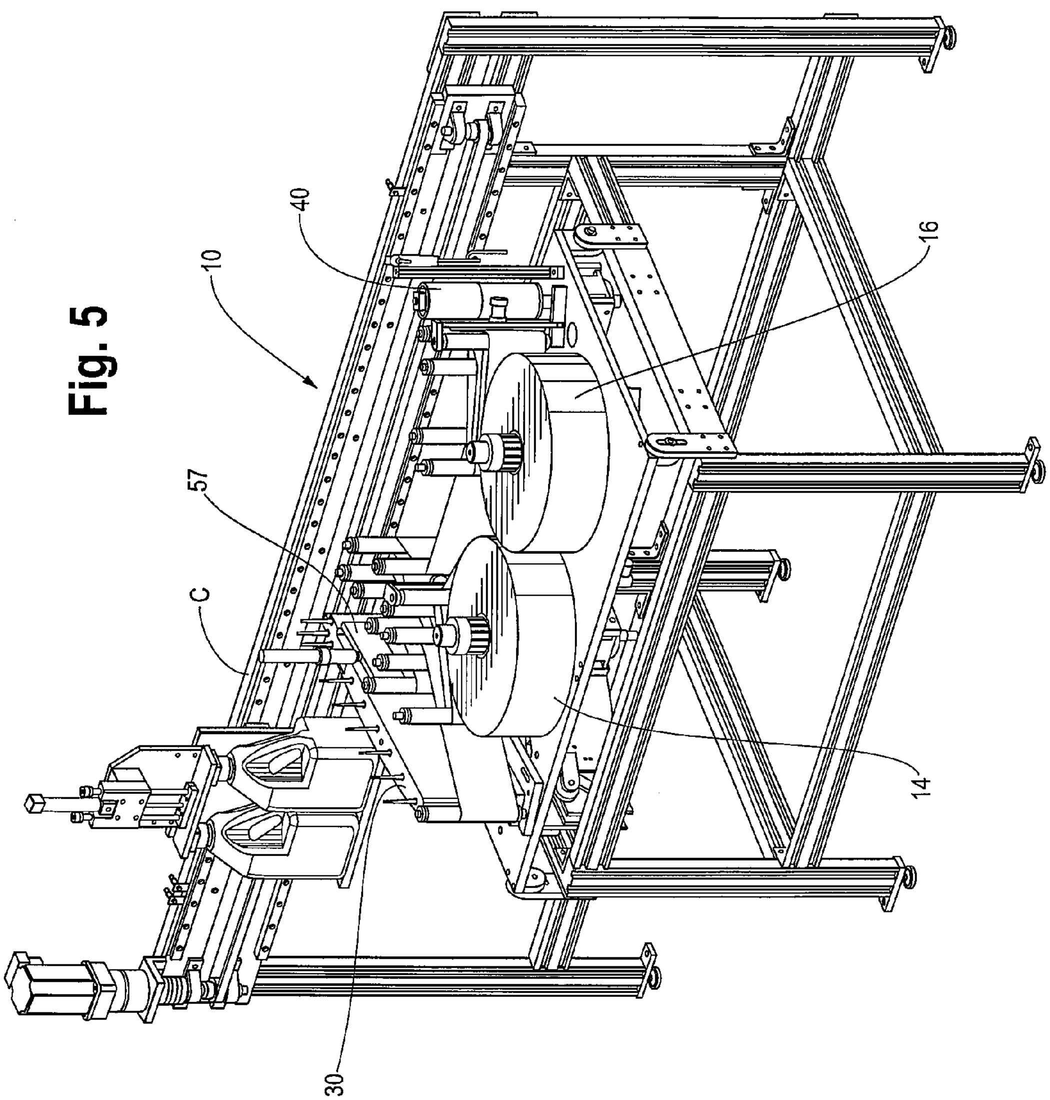

A laser sensor (head) 46 maps the profile or contour of the product P as it passes (or just prior to passing) the head 18. This is carried our for each "new" product profile. The laser 46 samples points from a start point (operator designated) along the product profile to an end point. A controller 48 includes code or commands such that the start and end points are mathematically blended to provide a smooth transition (rather than a sharp or step function) at the start and end of label L application. The mapping is a "learned" process, and a sample contour plot is illustrated in FIG. 2.

As the product (bottle) P is conveyed passed the laser sensor head 46 and the decorating head 18 (discussed below), it is inflated with compressed air. Inflating the products during label transfer is carried out to provide a resistance or back-pressure against the decorating head 18 pressing the label L to the product P and serves to maintain the intended or designed profile of the product P (e.g., product P shape) during label L transfer. Inflating during profile mapping assures that the mapped profile matches the profile of the product P during application.

Figure 6:
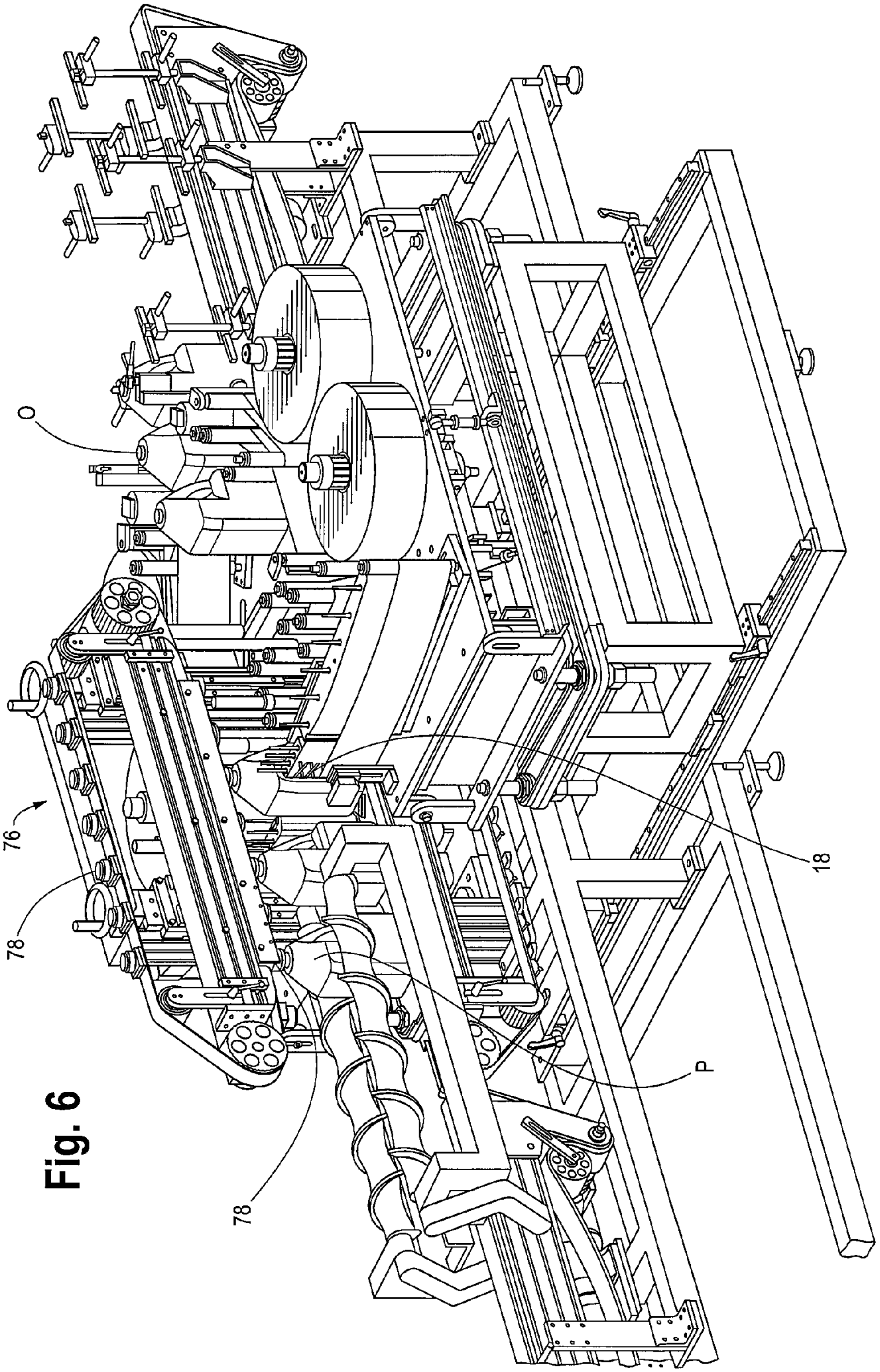
FIG. 6 is a partial perspective view of applicator system illustrating a product inflation subsystem.

Referring to FIG. 6, inflation is carried out at an inflation substation 76, by applying a moving cup seal 78 to an opening in the product (the open top O of the illustrated bottle) and introducing a predetermined quantity of compressed air into the product P through the cup seal 78. As the product P moves beyond the applicator 10, the cup seal 78 is removed from the product P thus allowing the product P to return to atmospheric pressure. The inflation pressure in the product is monitored to within about 0.1 psi to assure adequate inflation and to prevent over-inflation.

The decorating head 18 is also a servo-driven 50 element that reciprocates toward and away (as indicated by the double headed arrow at 52) from the product path 54, to move the web W and label L into contact with the product P in accordance with the mapping scheme developed by the laser head 46 and controller 48. Essentially, the mapping scheme (e.g., the laser taught contour) functions as an electronic cam to move the head 18 (and thus the web W and label L) to follow the product P profile. The cam profile is repeated once per product repeat pitch. The repeat pitch $P_P$ (i.e., the distance between the same point on two adjacent products P) is set by an operator and in a present transfer system 10 is variable between about 3 inches and about 9 inches; however, other repeat pitches are contemplated. When the repeat pitch is established, the head 18 is set to follow the cam profile at each repeat pitch interval.

The decorating head servo 50 is a linear movement element. It provides a high velocity, low inertia motion response to accurately follow the cam profile (or product contour) without exerting an over-pressure on the product P.

The head 18 includes a roller 56 (with the heater within the head support 34) to facilitate label L transfer. The web W is moved over the roller 56 at a speed that is matched to the product P movement during application. Between label L applications, the web W can change speed (increase or decrease) to properly position a next label for application to a next product, according to the product repeat pitch $P_P$ and the label pitch $L_P$ (the pitch of the labels L on the web W).

The decorating head roller 56 includes a matrix of holes and grooves (not shown) formed on its heated face, prior to the label transfer point. A vacuum is drawn at the face (again, prior to the transfer point) to the heated surface to assure fast and thorough heating of the label L. Immediately following transfer, the web W is cooled by passing the web W over a chiller plate 57 to cool the wax that remains on the web W. The chiller 57 is supplied with chilled air to cool the molten wax to prevent wax build-up on the adjacent surfaces (e.g., roller 36).

The present system 10 includes a number of features that enhance label L application speed and placement accuracy. First is the web transport system 11 which is configured to accurately move the web W through the applicator system 10 maintaining the web W at a fairly constant tension. The servo web feed roller 40 provides the motive force to move the web W through the system and the dancer arms 22, 24 are biased (as by springs 58) slides each having an idler roller 60, 62 at the end thereof over which the web W passes. The dancer arms 22, 24 provide for proper tension of the web W and are used to monitor the quantity of labels/web on the payout and take-up reels, 14, 16, respectively.

The position of each arm 22, 24 is monitored by a scaled analog signal transmitted from a transducer 64, 66 mounted to the slide 22, 24. In that the web W is looped over the rollers 60, 62, a one inch (linear) movement of either arm 22, 24 translates to a 2 inch linear movement of the web W. This is then compared to rotational movement of the reel 14, 16 (or conversely, how far the arm 22, 24, moves compared to a predetermined number, e.g., one, rotation of the reel 14, 16), which is then used to determine the circumference of the reel 14, 16 which corresponds to the quantity of labels/web on the reel 14, 16. Accordingly, the quantity of web W (an thus labels L) that remain on the payout reel 14 is know from the initial diameter, the rotational movement and the movement of the slide 22, 24. When a new roll of labels L is installed on the applicator system 10 the initial ratios are calculated by rotating the payout reel 14 (shaft 42) a predetermined distance until a target distance of the dancer arm 22 is detected. The rotation of the reel 14 (in degrees of rotation) that is needed to achieve the target arm 22 movement is calculated as a percentage of 360 degrees and this percentage is used to determine the initial circumference of the reel 14. By example, if 45 degrees of rotation is needed to produce a 3 inch movement of the dancer arm 22 (which is 6 inches of web W movement), the calculation of 360/45 yields a value of 8, which is then multiplied by the web W movement (6 inches) to yield an initial reel 14 circumference of 48 inches.

The next feature is the servo web positioner assembly 26 which defines a web path that is symmetrical before the decorating head 18 (as indicated generally by the arrow at 68) and after the decorating head (indicated generally at 70), e.g., a head approach path 68 which is between the payout reel 14 and the head 18 and an egress path 70 that is between the head 18 and the take-up reel 16.

The assembly includes a single servo actuator 26, which is a linear slide, having rollers 72*a,b* at the opposite ends 26*a,b*, with the roller 72*a* on one end 26*a* in the approach path 68 and the roller 72*b* on the opposing end 26*b* in the egress path 70. The egress path side 26*b* is nearer to the product path 54. In that the approach and egress paths 68, 70 are identical, movement of the web W is linear relative to the movement of the servo actuator 26.

As a result, as the web positioner servo 26 moves toward or away from the product path 54, the web W movement is two times that of the actuator 26, as long as the web W is held taut between the payout and take-up reels 14, 16. Web W movement is two times that of the servo 26 movement because the web W is looped around or over the rollers 72*a,b*. For example, a one inch movement of the actuator 26 away from the product path 54 (or into the approach path 68) results in a two inch linear forward movement (or advance) of the web W.

This movement of the web positioner servo 26 serves to accommodate two variables in the system, namely, the differences in the label pitch $L_P$ and product pitch $P_P$ and the differences in web W speed and product P speed. Where, for example product P speed is 360 inches per minute, labels L are applied at a rate of one (1) per second and the label pitch $L_P$ is 5 inches. If the product pitch $P_P$ is 6 inches, the web W moves at a speed of 300 inches per minute to account for the lesser label pitch $L_P$.

The web positioner servo 26 matches the web W speed to the product P speed during application of the label L to the product P. That is, the positioner servo 26 moves to “increase” the speed of the web W to a desired speed to provide a smooth transfer of the label L from the web W to the product P.

The web positioner servo 26 performs a cam profile once per product pitch $P_P$ to account for the pitch ($P_P$–$L_P$) differences. In between labels L (when the labels L are on a lesser pitch than the products), the cam profile jumps the positioner servo 26 to move the next label into position for transfer to the next product. In addition, using the web positioner servo 26, the web W can be run at a slightly faster or slower rate to control label L stretch during the application process.

It will also be appreciated that as the decorating head 18 reciprocates, it too advances and retracts the web W from its ordinary movement and speed. This movement of the web W must also be accommodated or accounted for in order to both position the label L properly and to match the web W speed with the product P speed. The web positioner servo 26 also serves to accommodate web W movement due to decorating head 18 movement to maintain the label L properly positioned for transfer.

In order to compensate for error in label L positioning as the decorating head 18 follows the product P contour, the positioner servo 26 and the decorating head roller 56 are geared to one another so that the position of the web W resulting from movement of the head 18 is compensated for by the positioner servo 26. For example, as the decorating head 18 moves toward the product P (following the profile), the positioner servo 26 moves away from the product path 54 an equal amount to prevent skewing of the label L.

Although the web feed roller 40 rotates at a relatively constant rate to move the web W through the applicator system 10 at a constant rate, it will be appreciated that the web W speed may not always be able to be maintained at a constant rate. Accordingly, a sensor eye 74 is mounted at the roller 40 to sense the presence or absence (or the indexing) of a registration mark R formed on the labels L or on the web W. The sensor eye 74 can be used (through the controller 48) to adjust the speed of the feed roller 40 to achieve a desired web W speed.

Figure 7:
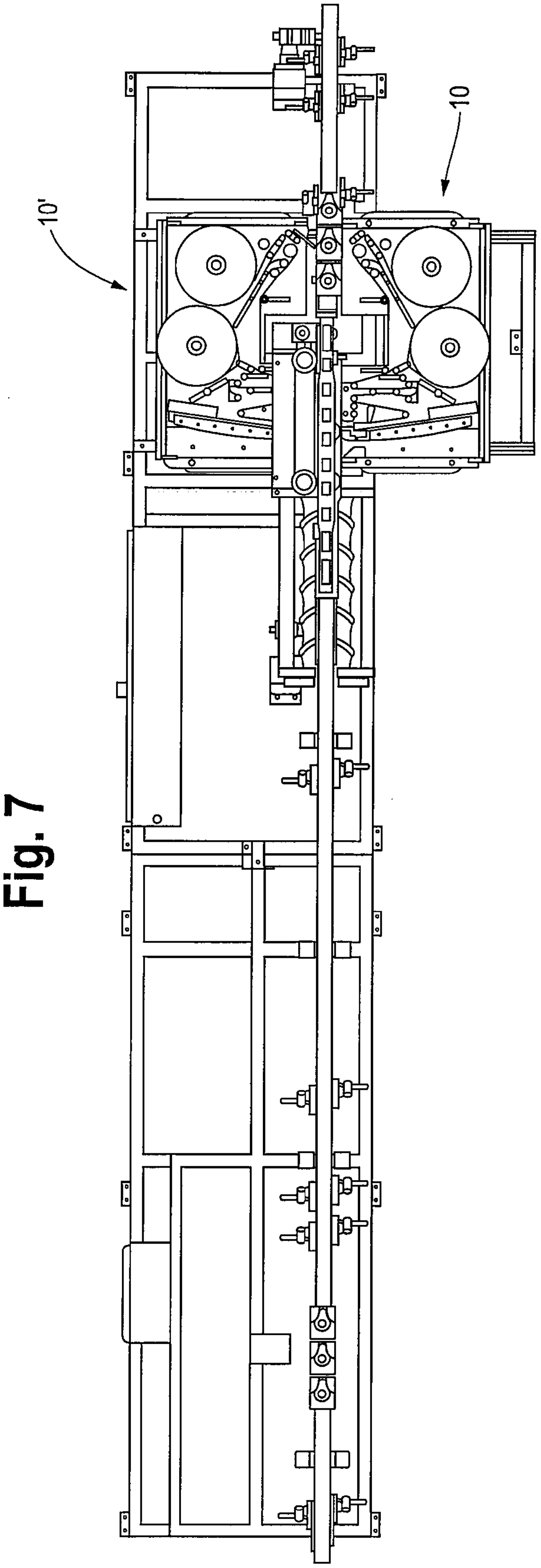
FIG. 7 is a top view of the applicator system of FIG. 6 showing a mirror image applicator or simultaneously applying labels to both sides of the bottles.

FIGS. 6 and 7 illustrate a labeling line that is configured for simultaneous two-sided application. The line includes labeling systems 10, 10' in mirror image relation to one another. In this manner labels can be applied to both sides of the product simultaneously and can make use of a single inflation subsystem.

All patents referred to herein, are hereby incorporated herein by reference, whether or not specifically done so within the text of this disclosure.

In the present disclosure, the words “a” or “an” are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover all such modifications as fall within the scope of the invention.

What is claimed is:

1. A method for transferring a label from a web to items moving on an item transport along a path, the items having a contoured surface, the method comprising the steps of:

advancing the item toward the web;

advancing the web along a label applicator head, the web being advanced at a relatively constant tension from a pay-out reel to a take-up reel;

sensing the contour of the item using a laser sensor and mapping the sensed contour of the item;

advancing or retracting the web in response to movement of the web, in response to movement of the applicator head to follow the item contour;

positioning the web to accommodate a difference in pitch of adjacent labels and a pitch of adjacent items to approximately match a speed of advancing the item to a speed of advancing the web;

reciprocating the applicator head in response to the contour of the mapped item, such that the applicator head follows the contour of the mapped item and the web is reciprocated with the applicator head; and transferring the label from the web to the item along the mapped contour of the item.

2. The method in accordance with claim 1 including the step of transferring a second label to an opposite of the item.

3. The method in accordance with claim 2 wherein the second label is transferred substantially simultaneously with the first label.

4. The method in accordance with claim 1 including the step of monitoring a quantity of the web on at least one of the pay-out and take up reels.

5. The method in accordance with claim 1 including the step of inflating the item for the step of transferring the label to the item.

6. A method for transferring a label from a web having a plurality of labels to a selected one of an item of a group of items moving on an item transport along a path, the items having a contoured surface, the method comprising the steps of:

advancing the item toward the web;

advancing the web along a label applicator head, the web being advanced at a relatively constant tension;

sensing the contoured surface of the item using a laser sensor and mapping the sensed contoured surface of the item;

positioning the web toward or away from the path to accommodate a difference in pitch of adjacent labels and a pitch of adjacent items to approximately match a speed of advancing the item to a speed of advancing the web;

reciprocating the label applicator head, such that the web moves therewith, to follow the sensed contoured surface of the item; and transferring the label from the web to the item along the contoured surface of the item.

* * * * *

UNITED STATES PATENT AND TRADEMARK OFFICE

CERTIFICATE OF CORRECTION

PATENT NO. : 8,696,839 B2
APPLICATION NO. : 13/005792
DATED : April 15, 2014
INVENTOR(S) : Gonzalez et al.

It is certified that error appears in the above-identified patent and that said Letters Patent is hereby corrected as shown below:

Title page, item (75), Inventors, line 1, "Gonzales," to read as --Gonzalez,--.

Signed and Sealed this
Twenty-third Day of December, 2014

Michelle K. Lee

Michelle K. Lee
*Deputy Director of the United States Patent and Trademark Office*

UNITED STATES PATENT AND TRADEMARK OFFICE

CERTIFICATE OF CORRECTION

PATENT NO. : 8,696,839 B2
APPLICATION NO. : 13/005792
DATED : April 15, 2014
INVENTOR(S) : Gonzalez et al.

It is certified that error appears in the above-identified patent and that said Letters Patent is hereby corrected as shown below:

Title page, item (12), “Gonzales et al.” to read as --Gonzalez et al.--.

Title page, item (75), Inventors, line 1, “Gonzales,” to read as --Gonzalez,--.

This certificate supersedes the Certificate of Correction issued December 23, 2014.

Signed and Sealed this
Twenty-fourth Day of March, 2015

Michelle K. Lee

Michelle K. Lee
*Director of the United States Patent and Trademark Office*